United States Patent
Dhabu et al.

(10) Patent No.: US 12,491,754 B2
(45) Date of Patent: Dec. 9, 2025

(54) VENT DEVICE FOR A VEHICLE CAB

(71) Applicant: Volvo Truck Corporation, Gothenburg (SE)

(72) Inventors: Amit Dhabu, Gothenburg (SE); Zenitha Chronéer, Torslanda (SE); Nishith Verma, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 351 days.

(21) Appl. No.: 18/031,660

(22) PCT Filed: Oct. 22, 2020

(86) PCT No.: PCT/EP2020/079700
§ 371 (c)(1),
(2) Date: Apr. 13, 2023

(87) PCT Pub. No.: WO2022/083862
PCT Pub. Date: Apr. 28, 2022

(65) Prior Publication Data
US 2023/0382193 A1    Nov. 30, 2023

(51) Int. Cl.
*B60H 1/24* (2006.01)

(52) U.S. Cl.
CPC .................... *B60H 1/249* (2013.01)

(58) Field of Classification Search
CPC ... B60H 1/248; B60H 1/249; Y10T 137/7838; F16K 15/144; F16K 15/16
See application file for complete search history.

(56) References Cited

U.S. PATENT DOCUMENTS 4,691,623 A * 9/1987 Mizusawa ............. F16K 15/147
137/846
4,781,106 A * 11/1988 Frien ..................... F16K 15/162
137/856
(Continued)

FOREIGN PATENT DOCUMENTS

DE        4434136 A1   3/1996
DE   102017004395 A1   11/2018
(Continued)

OTHER PUBLICATIONS

International Search Report and Written Opinion for International Patent Application No. PCT/EP2020/079700, mailed Jul. 21, 2021, 10 pages.
(Continued)

*Primary Examiner* — Ko-Wei Lin
(74) *Attorney, Agent, or Firm* — Withrow & Terranova, PLLC (57) ABSTRACT

A vent device for passage of an air flow from inside of a vehicle cab to the outside, the vent device comprising a main body having an inlet side, an outlet side and one or more air passages; an outer protection plate connected to the main body, wherein air flowing from the main body is directed to the outside via the outer protection plate, the vent device further comprising one or more main flaps, where each main flap is associated with a corresponding air passage, wherein each main flap is arranged to be moveable between a closed position and an open position, wherein each main flap is configured to move from the closed position to the open position when the air pressure inside the cab is higher than outside the cab.

9 Claims, 13 Drawing Sheets

(56) References Cited

U.S. PATENT DOCUMENTS

| | | | | |
|---|---|---|---|---|
| 2004/0261867 A1* | 12/2004 | Carlson | ............... | B60H 1/249 137/512.15 |
| 2008/0200109 A1* | 8/2008 | Valencia | ............... | B60H 1/249 454/70 |
| 2008/0268763 A1* | 10/2008 | Dippel | ............... | F16K 15/035 454/152 |
| 2009/0280736 A1* | 11/2009 | Schneider | ............... | B60H 1/249 454/162 |
| 2010/0291854 A1* | 11/2010 | Carlson | ............... | B60H 1/249 454/162 |
| 2011/0201263 A1 | 8/2011 | Srinivasan et al. | | |
| 2011/0230129 A1* | 9/2011 | Weber | ............... | B60H 1/249 454/162 |
| 2013/0303068 A1 | 11/2013 | Hall et al. | | |
| 2014/0057543 A1* | 2/2014 | Kim | ............... | B60H 1/26 454/165 |
| 2014/0242897 A1* | 8/2014 | Rizzo | ............... | B60H 1/249 454/162 |
| 2016/0152114 A1* | 6/2016 | Yamamoto | ............... | F16K 15/031 454/162 |
| 2016/0193897 A1* | 7/2016 | Fiebiger | ............... | B60H 1/249 454/162 |
| 2017/0320377 A1* | 11/2017 | Huët | ............... | F24F 11/75 |
| 2017/0326948 A1* | 11/2017 | Huët | ............... | B60H 1/249 |
| 2018/0215236 A1* | 8/2018 | Carlson | ............... | F24F 11/745 |
| 2019/0054803 A1* | 2/2019 | Carlson | ............... | B60H 1/249 |
| 2019/0152295 A1* | 5/2019 | Fischer | ............... | B60H 1/249 |
| 2019/0152296 A1* | 5/2019 | Lefever | ............... | B60H 1/249 |
| 2019/0275863 A1* | 9/2019 | Barnes | ............... | B60H 1/249 |
| 2019/0283540 A1* | 9/2019 | Jansen | ............... | B60H 1/249 |
| 2020/0062084 A1* | 2/2020 | Porter | ............... | B60H 1/249 |
| 2020/0086716 A1* | 3/2020 | Carlson | ............... | B60H 1/248 |
| 2020/0180403 A1* | 6/2020 | Shelley | ............... | F24F 13/15 |
| 2020/0189359 A1* | 6/2020 | Barnes | ............... | B60H 1/249 |
| 2020/0263801 A1* | 8/2020 | Sterbenz | ............... | F16K 1/2021 |

FOREIGN PATENT DOCUMENTS

| | | |
|---|---|---|
| FR | 2893540 A1 | 5/2007 |
| JP | S5477350 U | 6/1979 |

OTHER PUBLICATIONS

Examination Report for European Patent Application No. 20796766.2, mailed May 15, 2025, 6 pages.

\* cited by examiner

FIG. 9c ll# VENT DEVICE FOR A VEHICLE CAB

This application is a 35 USC 371 national phase filing of International Application No. PCT/EP2020/079700, filed Oct. 22, 2020, the disclosure of which is incorporated herein by reference in its entirety.

TECHNICAL FIELD

The invention relates to a vent device for passage of an air flow from inside of a vehicle cab to the outside.

The invention can typically be applied in a cab of a heavy-duty vehicle, such as a truck. Although the invention will be described with respect to a truck it is not restricted to this particular vehicle.

BACKGROUND

Vehicle cabs, such as truck cabs, are normally provided with one or more vent devices for allowing air to pass from an inside of the cab to an outside thereof. The vent devices are often located in an opening on a side or rear wall of the cab and, typically, air from the panel, defrost or door (slam) closing is directed towards the vent devices via a path formed between wall trims and sheet metal.

Position and design of the vent devices affect the comfort in the cab. The required air flow capacity of the vent device depends e.g. on the Body In White (BIW) leakage, i.e. the leakage of the sheet metal structure forming the cab. The tighter the BIW, the larger is the required capacity of the vent devices, and the trend is that vehicle cabins become even tighter. An increased air pressure inside the cab may result in driver/passenger discomfort due to pressure effect in ears when the door is closed. However, vent devices cannot simply be designed with a very large through-flow area that provide for a sufficient maximum capacity since this typically results in an increased risk of introducing exterior noise, dust and water into the cab. In addition, there is normally only a limited space available in modern truck cabins for arranging vent devices.

US2011/0201263A1 discloses a ventilation system for a vehicle cab where an exit vent provided with a simple flap mechanism is arranged on a wall of the cab. Such a simple flap mechanism is, however, not sufficient for meeting the demands of modern vehicle cabs with small air leakage.

There is thus a need for improved and more dynamic vent devices for modern vehicle cabs.

SUMMARY

An object of the invention is to provide a more dynamic vent device for a modern, air-tight vehicle cab.

The invention concerns a vent device for passage of an air flow from inside of a vehicle cab to the outside, said vent device comprising: a main body having an inlet side, an outlet side and one or more air passages; an outer protection plate connected to the main body, wherein air flowing from the main body is directed to the outside via the outer protection plate.

The vent device further comprises one or more main flaps, wherein each main flap is associated with a corresponding air passage, wherein each main flap is arranged to be moveable between a closed position, in which it at least partly covers the corresponding air passage, and an open position, in which air is allowed to pass through the corresponding air passage in a flow path to the outside of the cab via the protection plate, wherein each main flap is configured to move from the closed position to the open position when the air pressure inside the cab is higher than outside the cab.

In addition, the vent device comprises one or more additional flaps which are movable between a closed position and an open position, wherein each additional flap in its open position provides an alternative flow path to the outside of the cab via the protection plate.

Accordingly, the vent device is not only provided with main flaps, which could be of a conventional flap design, but also with additional flaps providing an alternative flow path.

This enables a dynamic vent device design where, for instance, the main flaps are capable of handling an outflow of air resulting from a moderate pressure increase inside the cab and where the additional flaps are opened only at a higher pressure increase so as to provide alternative or additional flow paths that makes the device capable of handling also a larger outflow of air resulting from the higher pressure increase. By arranging the additional flaps within a projected area of the main body (i.e. the additional flaps may e.g. be arranged downstream or onto the main flaps within the projected area of the main body), the area required on the wall (or, alternatively, on the ceiling/roof or floor) of the cab for arranging the vent device does not necessarily have to be larger than for a conventional vent device that is provided only with one or more main flaps.

In an embodiment, the outer protection plate is provided with one or more plate openings forming said alternative flow path, wherein each of the one or more additional flaps is arranged on the outer protection plate in association with a corresponding plate opening. In this case the air is allowed to flow also through, and not only at a side of, the protection plate when there is a need to handle a large outflow of air through the vent device. Since the additional flaps are opened only occasionally, the protection plate, which prevents e.g. dirt and water from entering the cab through the vent device, can still be kept closed (with the additional flaps closed) during normal conditions.

In an embodiment, one or more of the main flaps is provided with a flap opening forming said alternative flow path, wherein each of the one or more additional flaps is arranged on the one or more main flaps in association with a corresponding flap opening. In this case the air is allowed to flow also through, and not only at a side of, the one or more main flaps when there is a need to handle a large outflow of air through the vent device.

In a combined embodiment, additional flaps are arranged both on the outer protection plate as well as on the one or more main flaps.

In an embodiment where the additional flaps are arranged on the main flaps, the additional flaps are smaller than the main flaps. In such a case, the main flap may form a frame that extends around the flap opening.

In an embodiment, the vent device is provided with stop means arranged to prevent each of the main and additional flaps from moving in a direction towards the main body when set in their closed position. Where a smaller additional flap is arranged on a main flap in association with a corresponding flap opening in the main flap, the additional flap may be larger than the corresponding flap opening so that a part of the main flap surrounding the flap opening defines a closed end position for the additional flap. Similarly, the plate opening(s) in the protection plate may be smaller than the corresponding additional plate.

In an embodiment, each of the main and additional flaps are arranged in a pivoting manner with one side portion of each flap attached to the vent device and remaining side portions being non-attached so as to allow a swivelling movement between the closed and open positions. When attached to the vehicle cab, the vent device is typically oriented such that the attached side portion forms an upper side of the flap. Gravity will then set the flap in its closed position automatically when the overpressure inside the cab is sufficiently small. The flaps may have a rectangular shape.

In an embodiment, the one or more main flaps are arranged at an angle in relation to the inlet side of the main body so that the main flap's attached side portion is located closer to the inlet side than a side portion opposite to the attached side portion. Thus, when the vent device is oriented so that the attached side portion forms an upper side of the flap, the flap is not oriented vertically in its closed position but at an angle in relation a vertical line with its free side portion located downstream of its fixed side portion. This angle may be around depending on the particular application (size and density of flaps, desired air flow at certain overpressure inside the cab, etc.). An angle of at least around 10° ensures that gravity can set the main flap in its closed position.

The invention also relates to a vehicle comprising a cab, such as a truck, wherein the cab is provided with a vent device according to above.

In an embodiment of the vehicle, the vent device is arranged in an opening of a cab wall with the inlet side of the main body facing the inside of the cab and the outer protection plate facing outwards.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

DETAILED DESCRIPTION OF EXAMPLE EMBODIMENTS OF THE INVENTION

Figure 1:
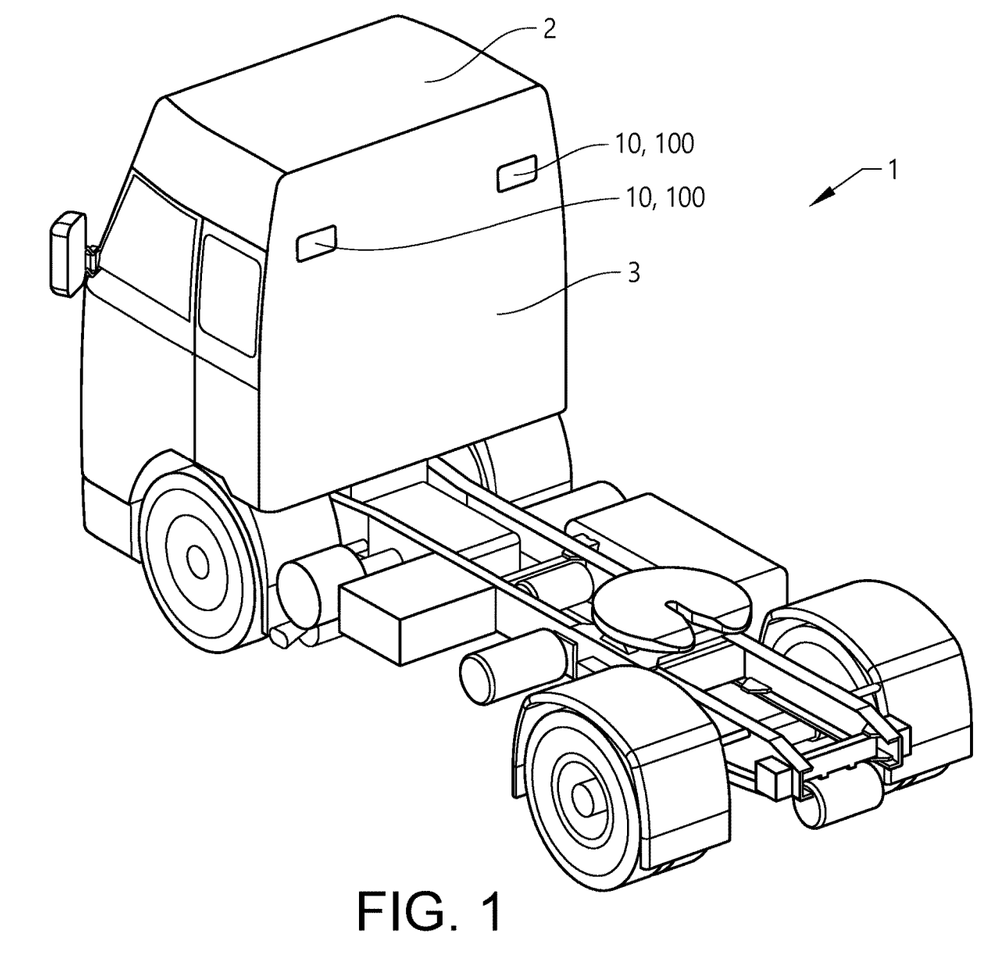
FIG. 1 shows a vehicle in the form a truck provided with a cab that in turn is provided with a vent device according to the present disclosure.

FIG. 1 shows a vehicle in the form a truck 1 provided with a cab 2 that in turn is provided with a first and a second vent device 10, 100. Each vent device 10, 100 is in this example arranged in a corresponding opening in a rear wall 3 of the cab 2.

A first embodiment of the vent device 10 is described below with reference to FIGS. 2-5c and a second embodiment of the vent device 100 is described below with reference to FIGS. 6-9c. Similar or identical parts in the two embodiments have been given the same reference numbers. Each embodiment is suitable for passage of an air flow from an inside of the vehicle cab 3 to the outside.

Figure 3:
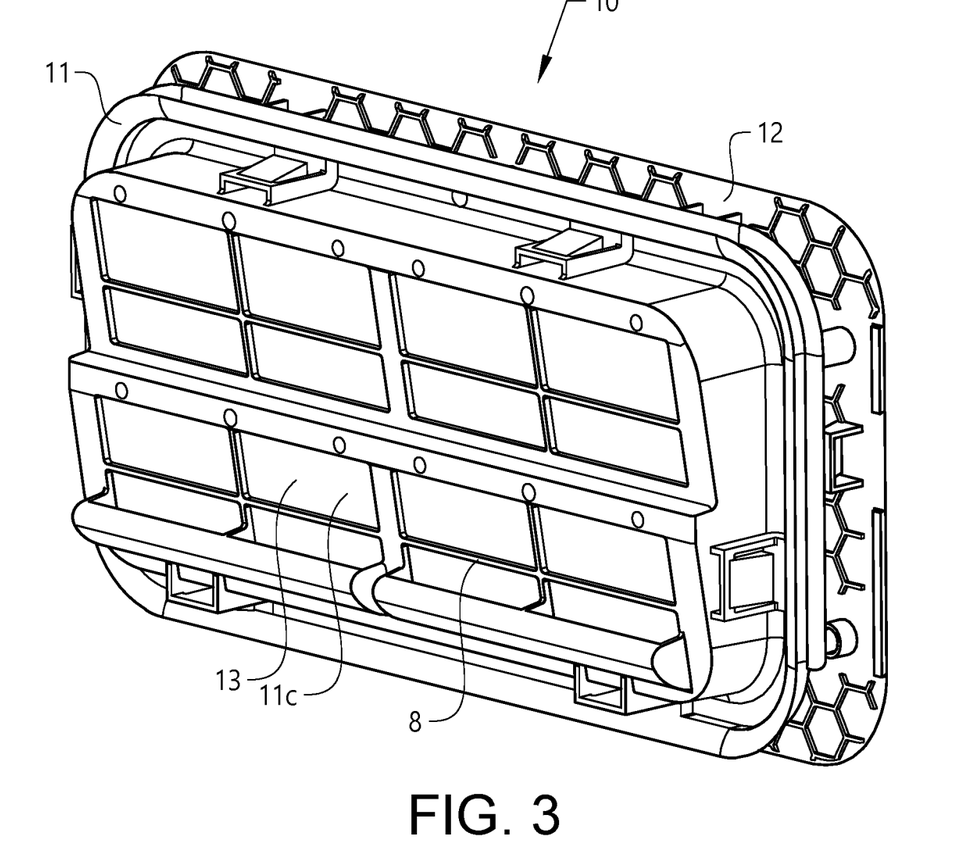
FIG. 3 shows an inwardly facing side of the embodiment of FIG. 2.
Figure 4:
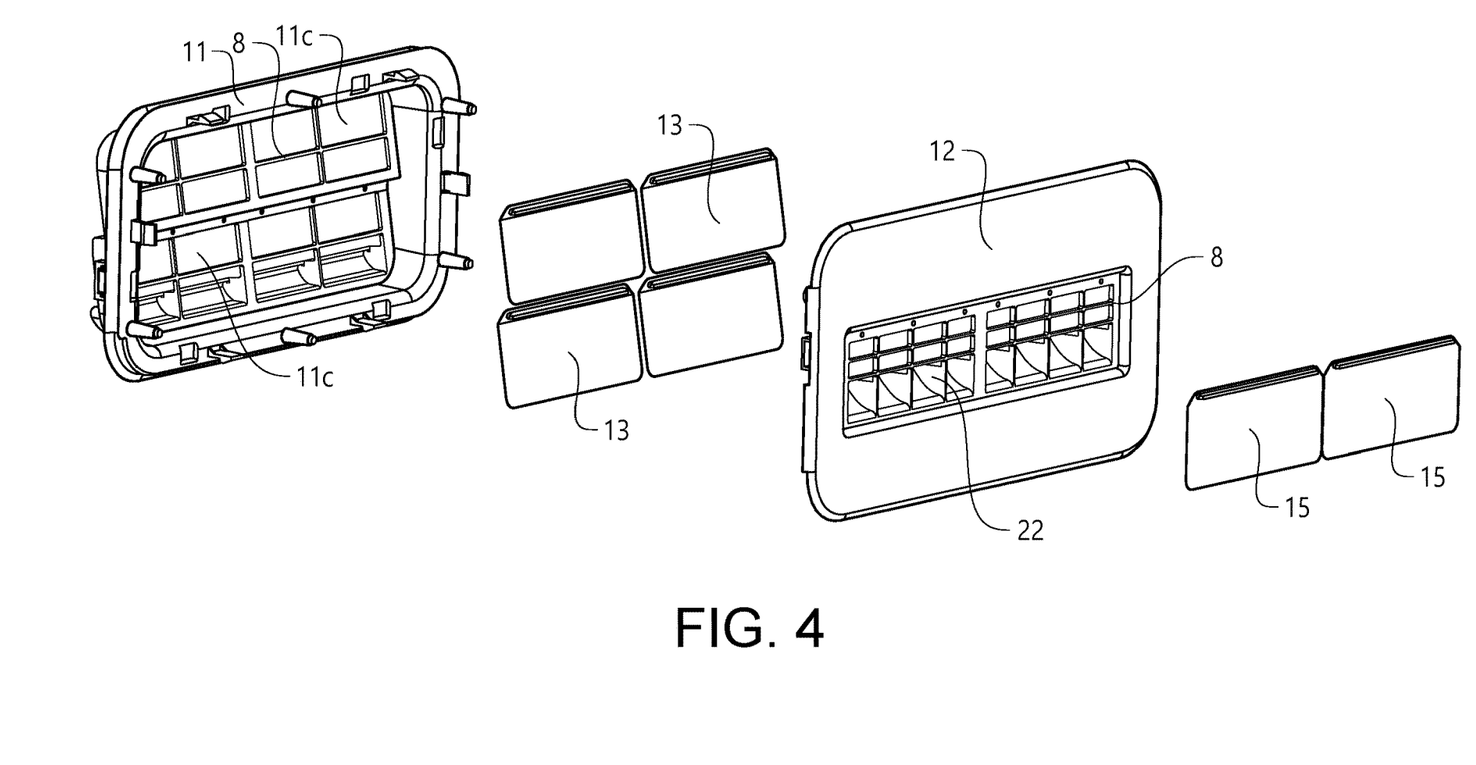
FIG. 4 shows an exploded view of the embodiment of FIG. 2.
Figure 5A:
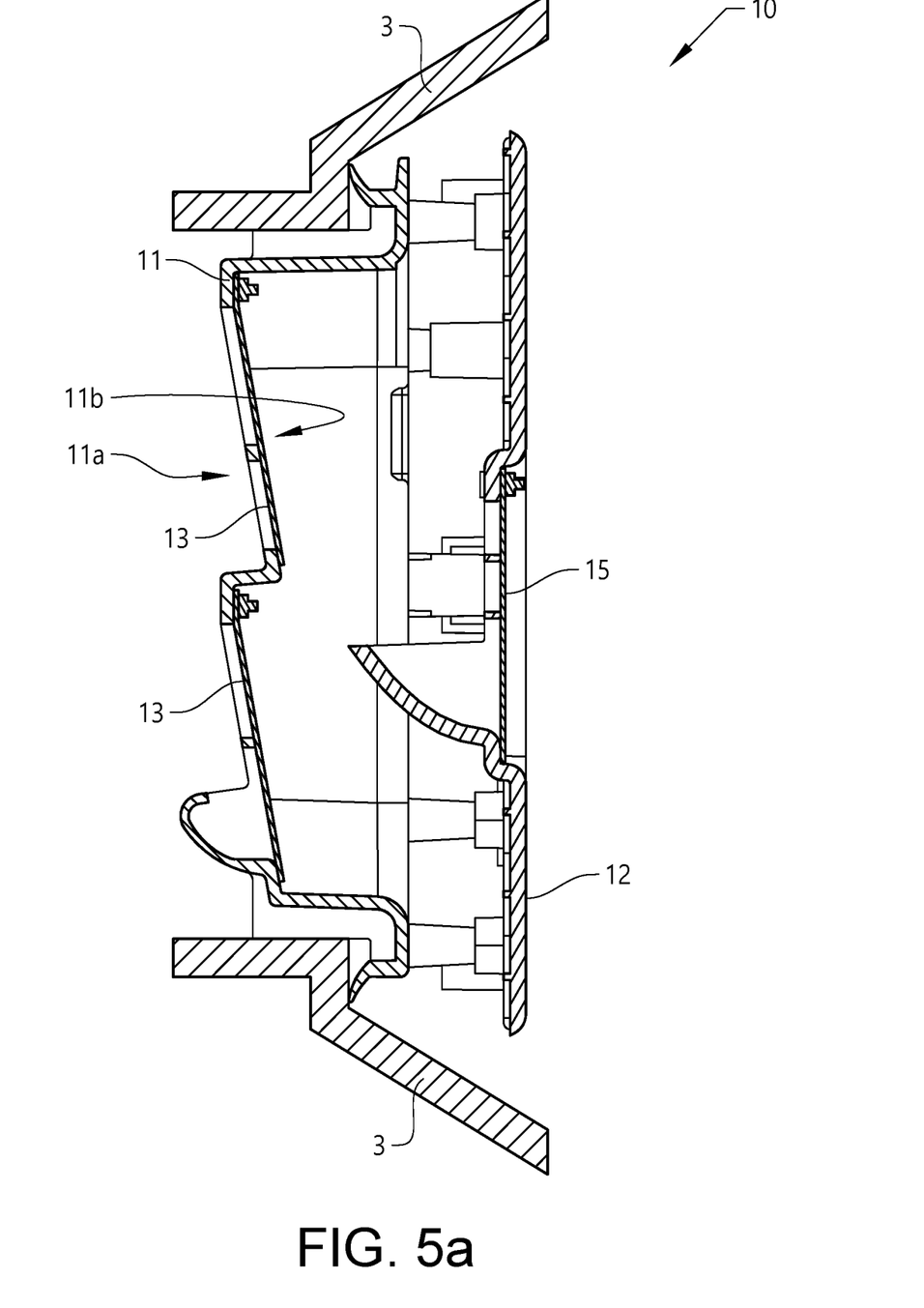
FIGS. 5a-5c show the function of the embodiment of FIG. 2 at different pressures.
Figure 5B:
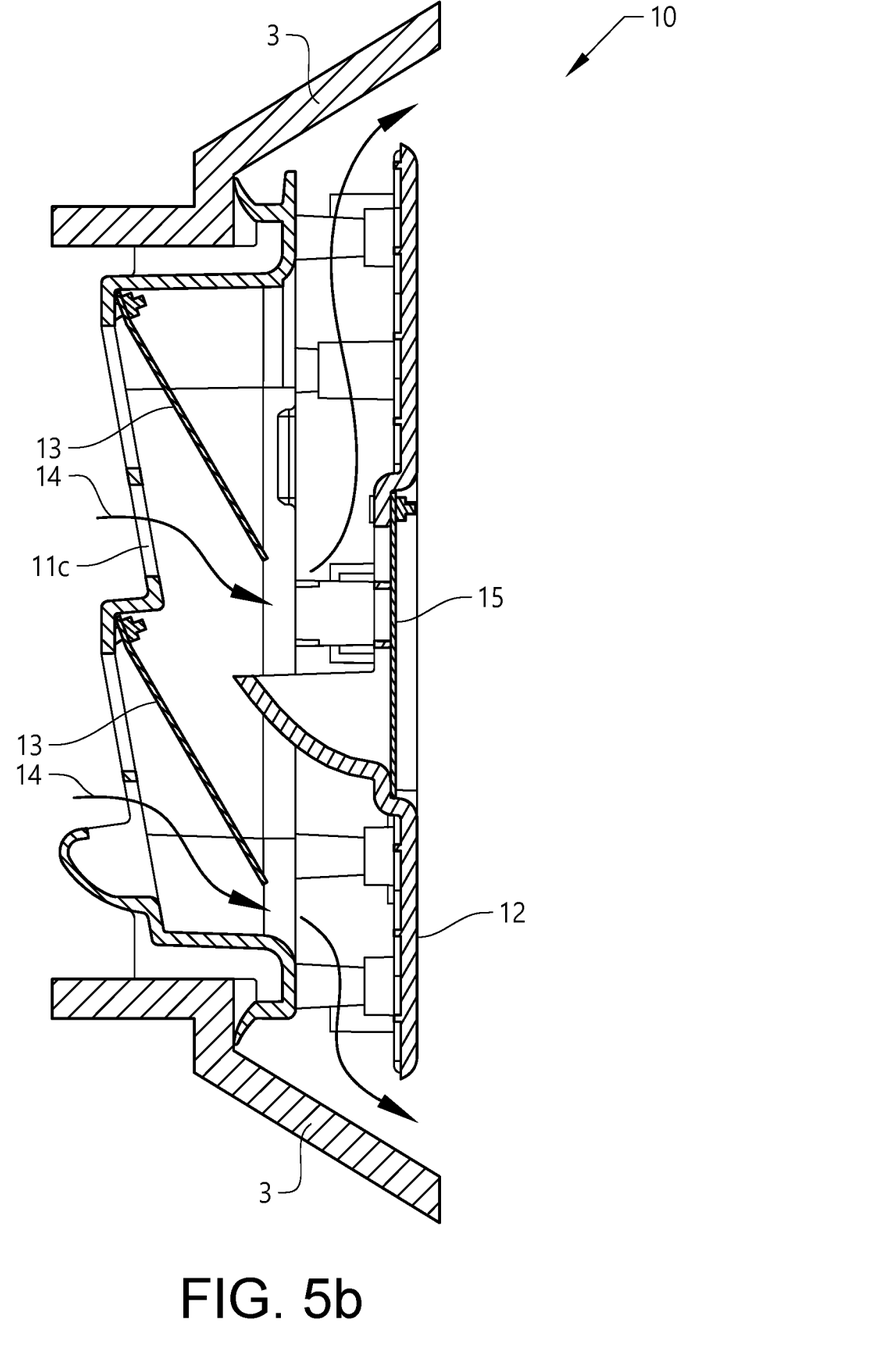
Figure 5C:
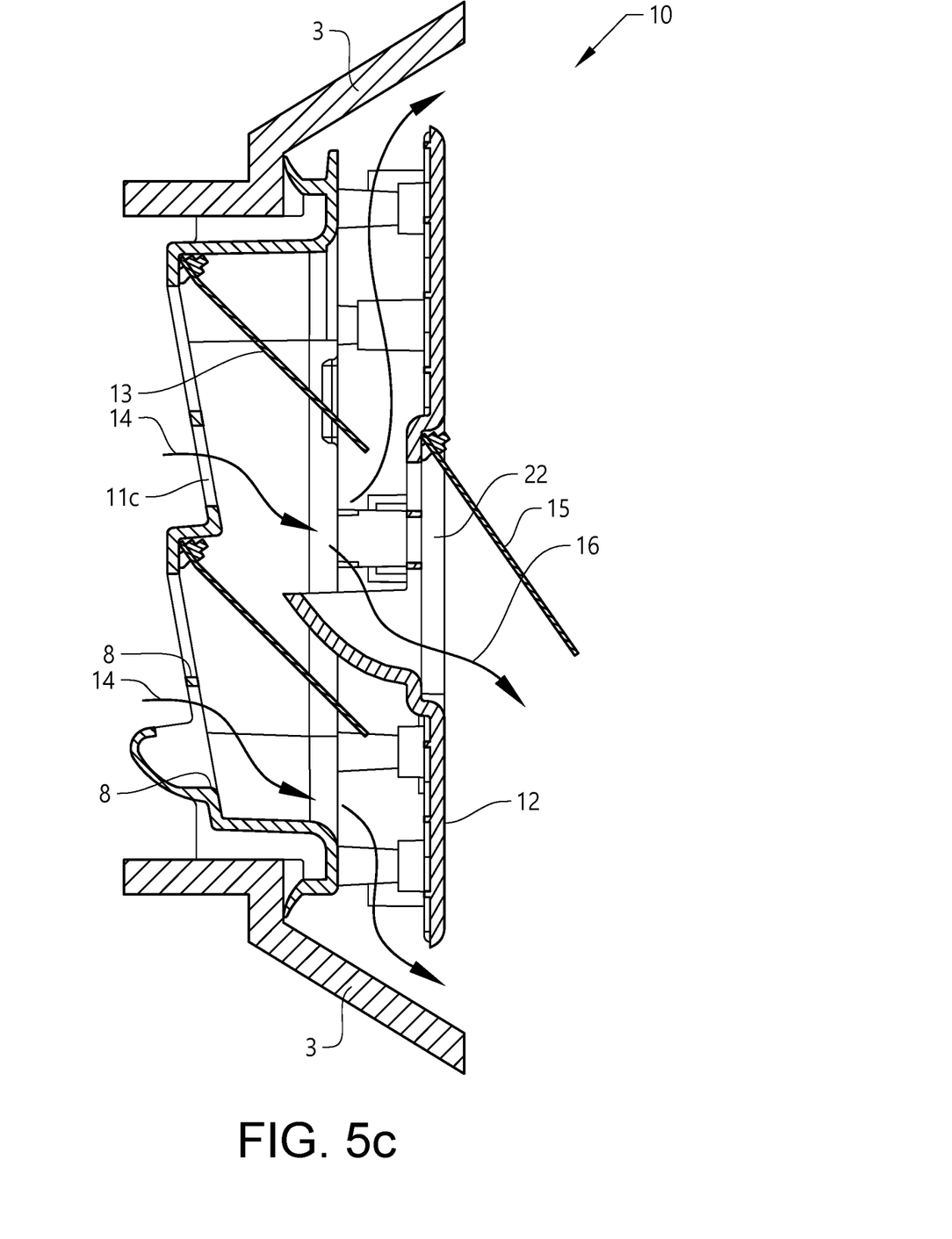

As can be seen in FIGS. 2-5c, the first embodiment of the vent device 10 comprises a main body 11 having an inlet side 11a, an outlet side 11b and one or more air passages 11c, and it also comprises an outer protection plate 12 connected (in this case by a snap mechanism) to the main body 11. As shown in FIGS. 5a-5c, air flowing from the main body 11 is directed to the outside via the outer protection plate 12.

Figure 2:
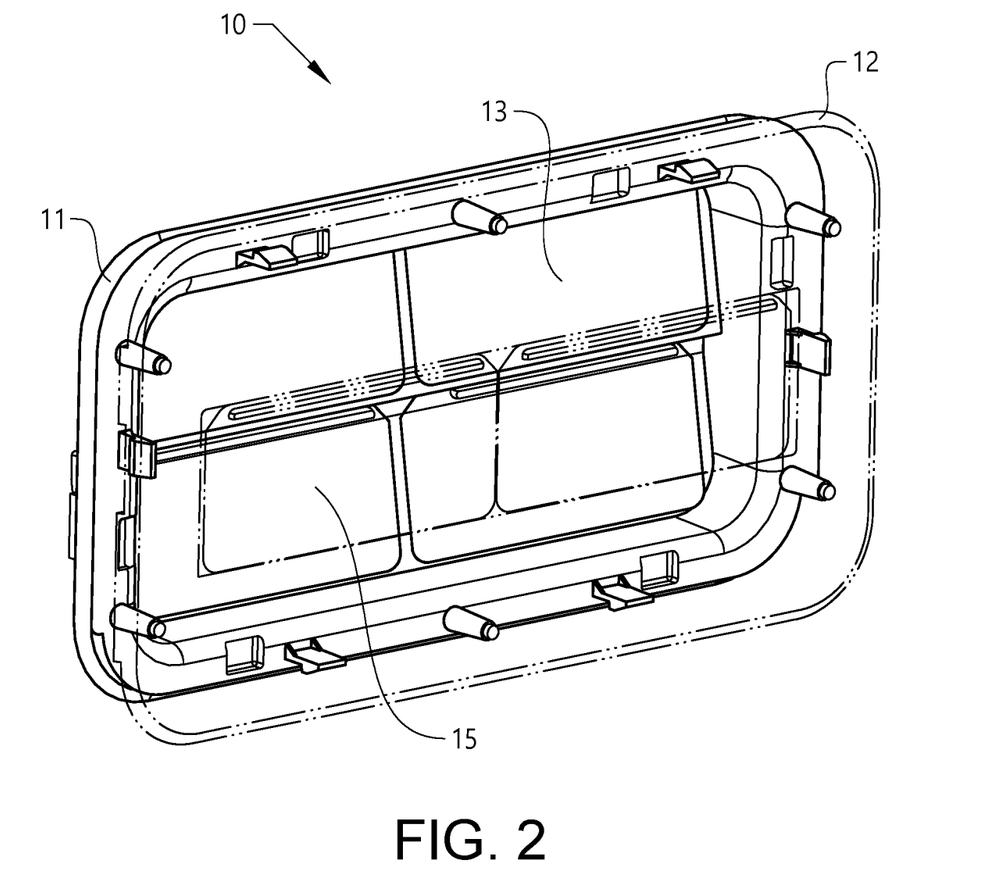
FIG. 2 shows an outwardly facing side of a first embodiment of a vent device according to the present disclosure.

In FIG. 2 the outer protection plate 12 is illustrated as transparent to show the parts located 35 behind.

The vent device 10 further comprises a plurality of main flaps 13, wherein each main flap 13 is associated with a corresponding air passage 11c. Each main flap 13 is arranged to be moveable between a closed position (see FIG. 5a), in which it covers the corresponding air passage 11c, and an open position (see FIGS. 5b and 5c), in which air is allowed to pass through the corresponding air passage 11c in a flow path 14 to the outside of the cab 2 via the protection plate 12 (above and below the plate 12 as indicated in FIG. 5b). Both FIGS. 5b and 5c show the main flaps 13 in the open position; the difference is that in figure the main flaps 13 are more open than in FIG. 5b. Each main flap 13 is configured to move from the closed position to the open position when the air pressure inside the cab 2 is higher than outside the cab 2.

The vent device 10 is also provided with in this case two additional flaps 15 which are movable between a closed position and an open position, wherein each additional flap 15 in its open position provides an alternative flow path 16 to the outside of the cab 2 via the protection plate 12. In this embodiment, the outer protection plate 12 is provided with two plate openings 22 (see e.g. FIG. 4) forming said alternative flow path 16, and each of the two additional flaps 15 is arranged on the outer protection plate 12 in association with a corresponding plate opening 22. The alternative flow path 16 to the outside of the cab 2 goes thus in this embodiment through the plate 12 as indicated in FIG. 5c.

FIGS. 5a-5c show the function of the embodiment of FIGS. 2-4 at varying overpressure inside the cab 2. In FIG. 5a the pressure inside the cab 2 is the same as (or only slightly higher than, or lower than) the pressure outside the cab 2. All flaps 13, 15 are therefore in their closed position and there is no air flow through the vent device 10.

In FIG. 5b there is a moderate overpressure inside the cab 2 so that air is forced outwards through the vent device 10. The main flaps 13 are in their open position and air flows via flow path 14 towards the outer protection plate 12 and further out to the surroundings at a side of the protection plate 12. The overpressure is here not sufficiently large to generate an air flow of such magnitude that the additional flaps 15 open.

In FIG. 5c there is high over pressure inside the cab 2 generating a substantial air flow sufficient to set both the main flaps 13 and the additional flaps 15 in their open position. As in FIG. 5b the air flows along flow path 14 but also in the alternative flow path 16 through the plate openings 22 at the opened additional flaps 15. The vent device 10 is thus arranged so that the additional flaps 15 opens at some threshold overpressure/air flow and provides for additional flow capacity through the device when needed. When the overpressure/air flow decreases the additional flaps 15 will move to its closed position, and after further decrease in pressure/flow also the main flaps 13 will close at some point.

The second embodiment of the vent device 100 shown in FIGS. 6-9c is in many ways similar to the first embodiment of the vent device 10 described above. The main difference is that the main flaps 13 of the vent device 100 are provided with a flap opening 23 forming said alternative flow path 160, wherein each of the one or more additional flaps 150 is arranged on the one or more main flaps 13 in association with a corresponding flap opening 23. Thus, instead of arranging the additional flaps and the alternative flow path in the outer protection plate 12 as described above, these parts are arranged onto the main flaps 15 in the second embodiment.

Figure 6:
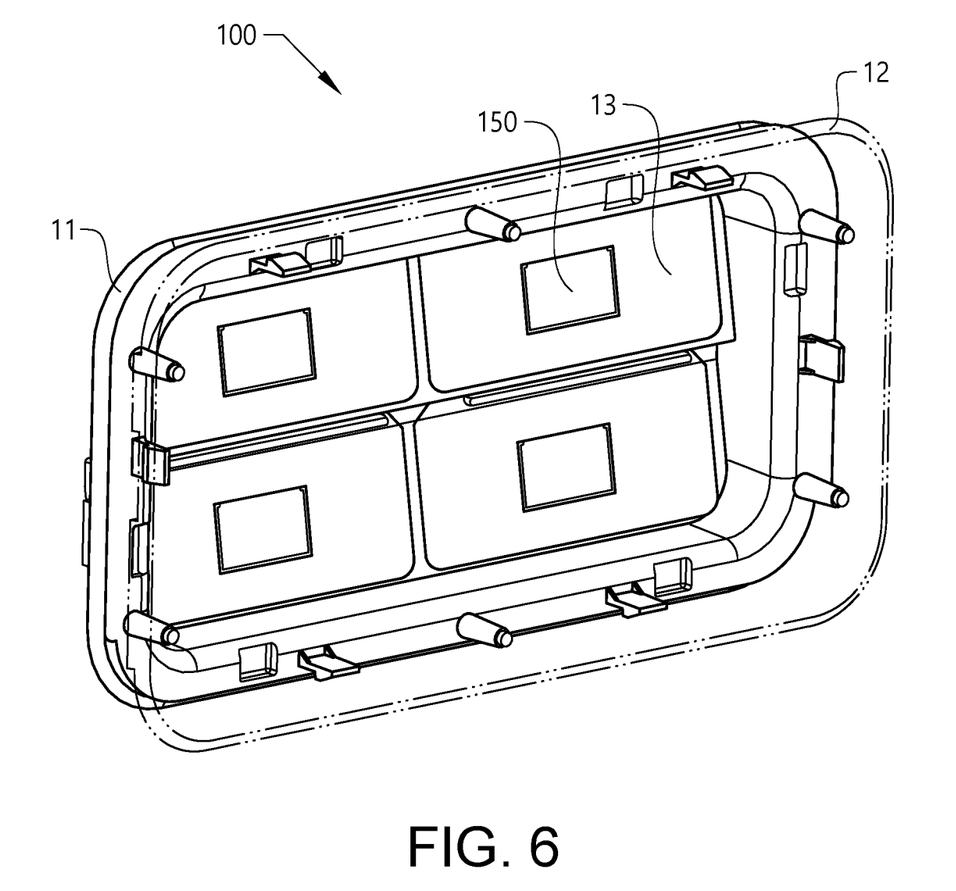
FIG. 6 shows an outwardly facing side of a second embodiment of a vent device according to the present disclosure.

As shown in FIGS. 6-9c, the additional flaps 150 are smaller than the main flaps 13 and the main flap 13 forms a frame that extends around its corresponding flap opening 23 and additional flap 150 (see e.g. FIG. 6).

Figure 7:
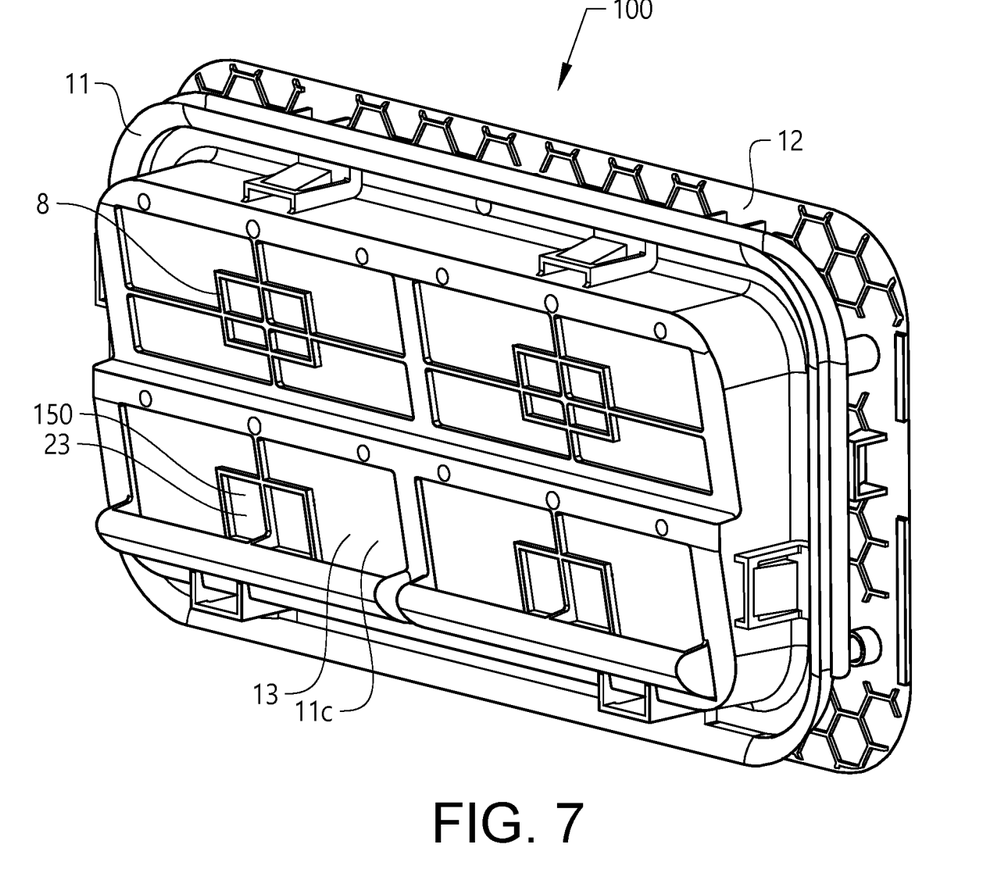
FIG. 7 shows an inwardly facing side of the embodiment of FIG. 6.
Figure 8:
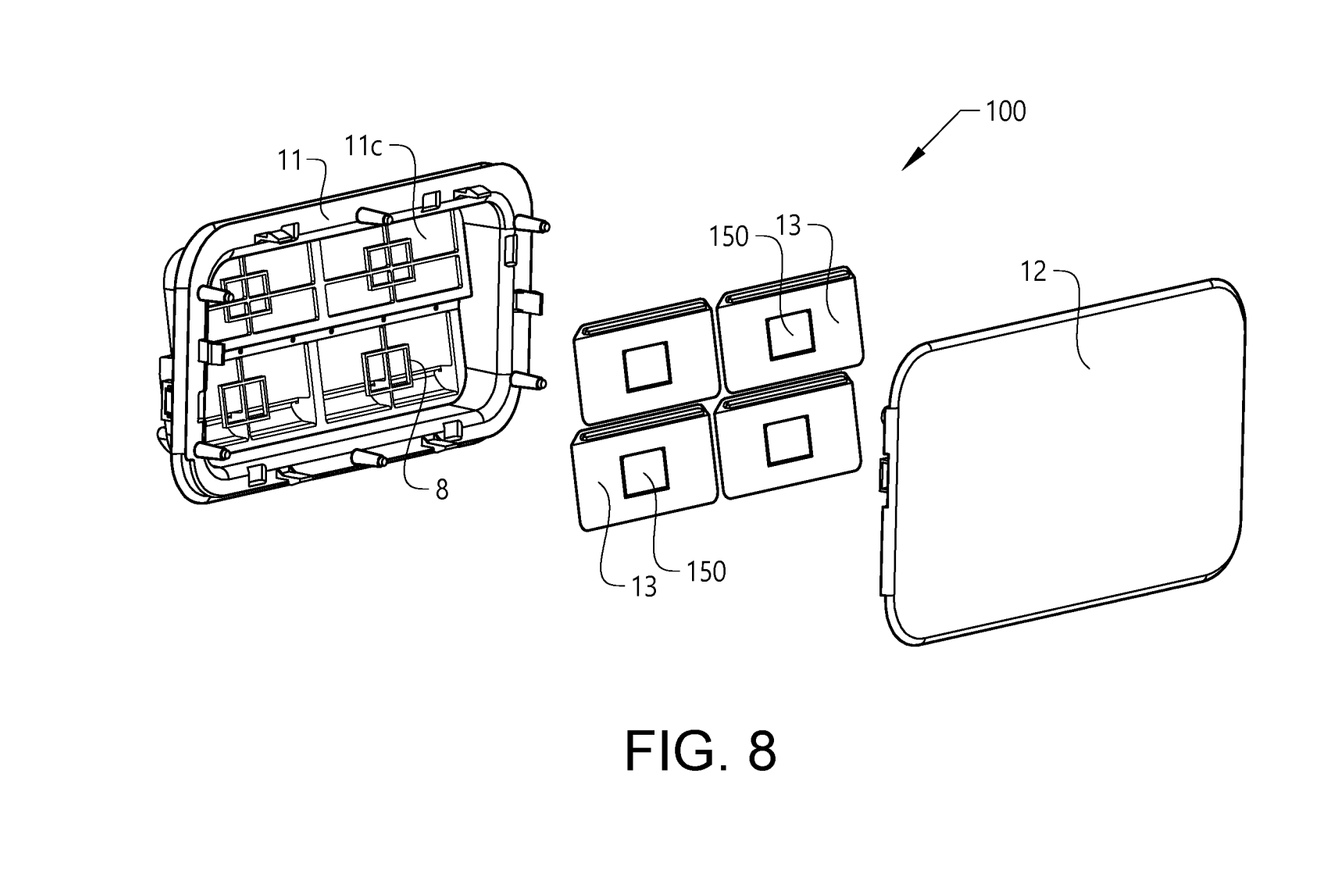
FIG. 8 shows an exploded view of the embodiment of FIG. 6.
Figure 9A:
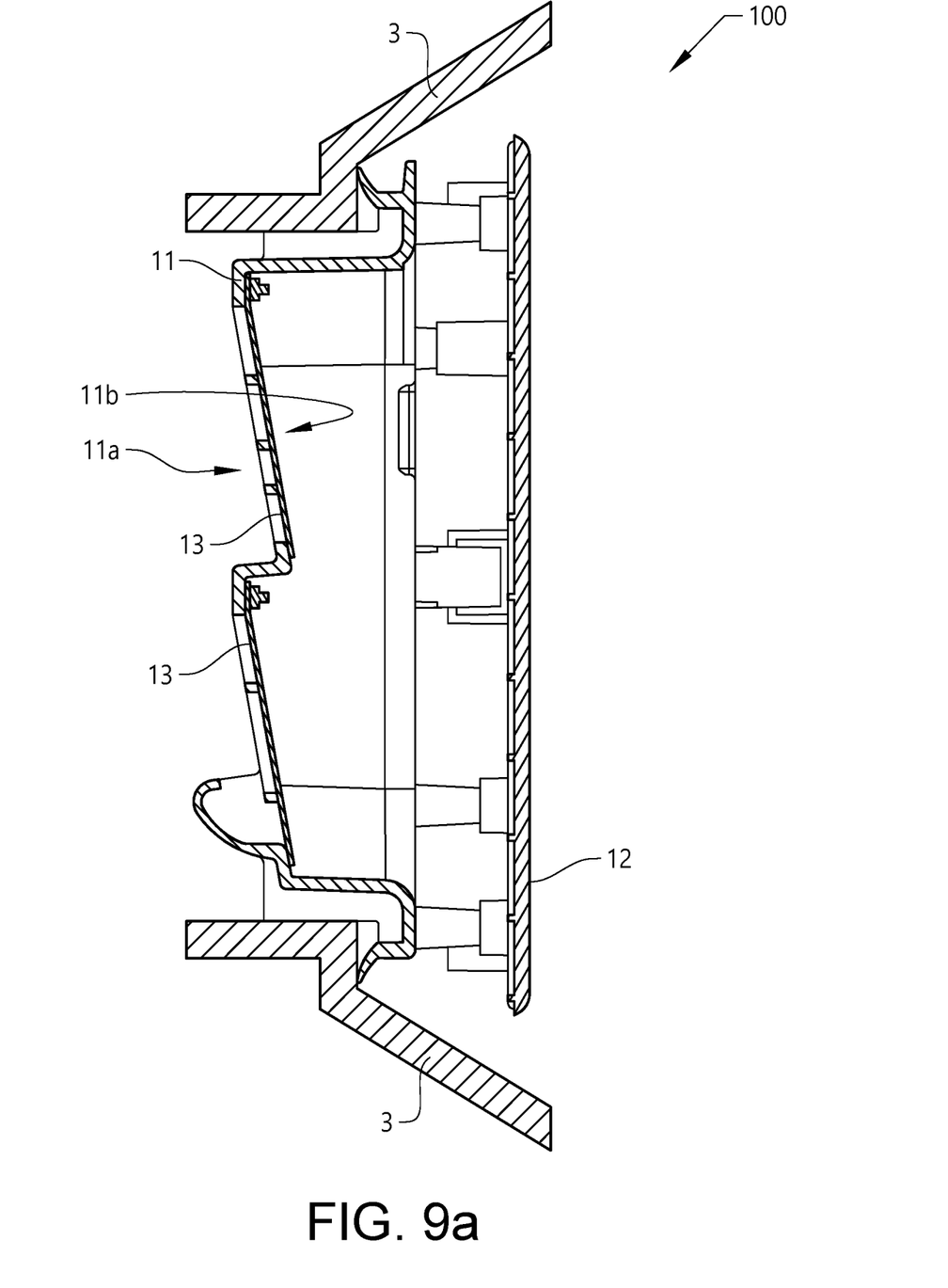
FIGS. 9a-9c show the function of the embodiment of FIG. 6 at different pressures.
Figure 9B:
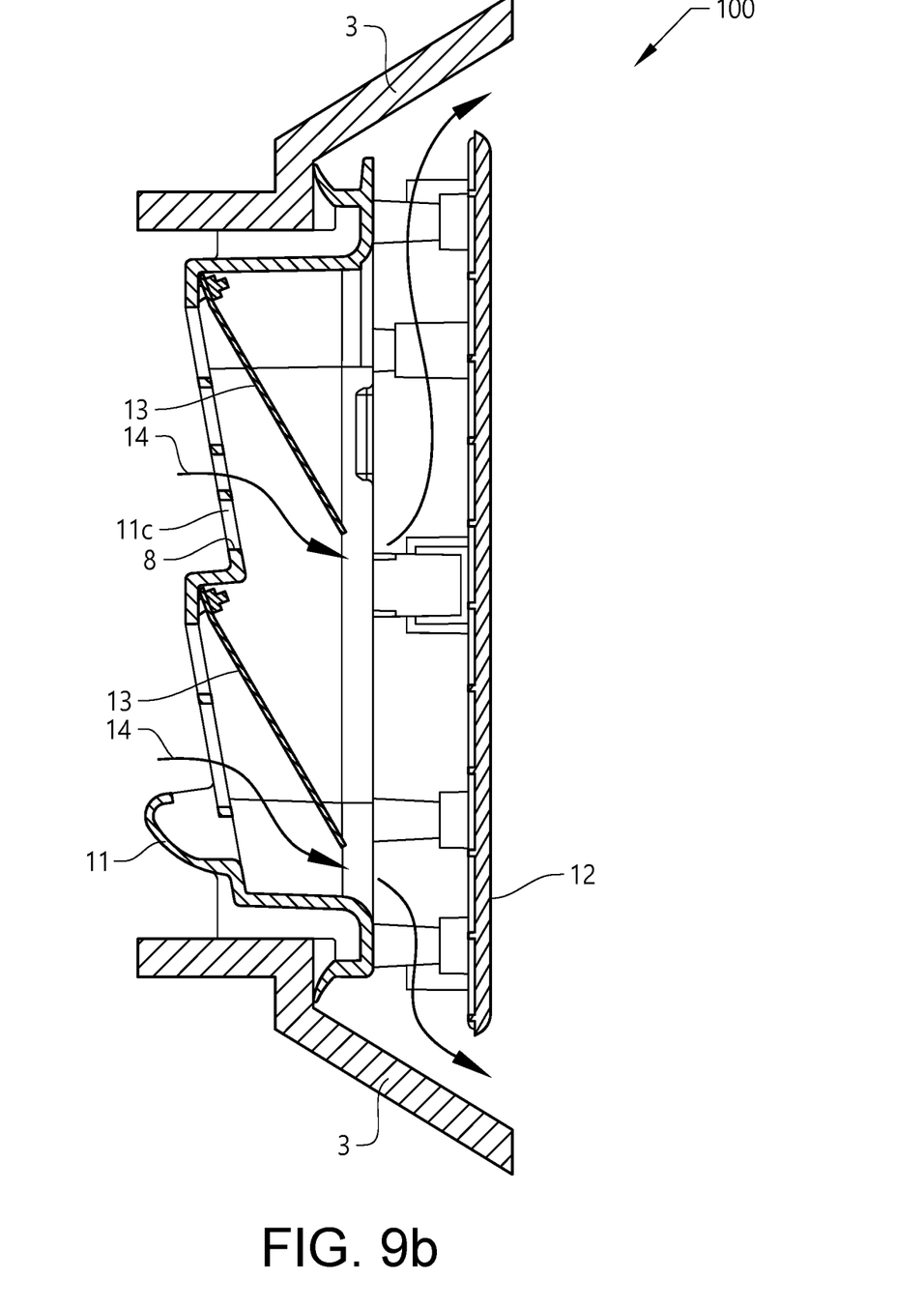
Figure 9C:
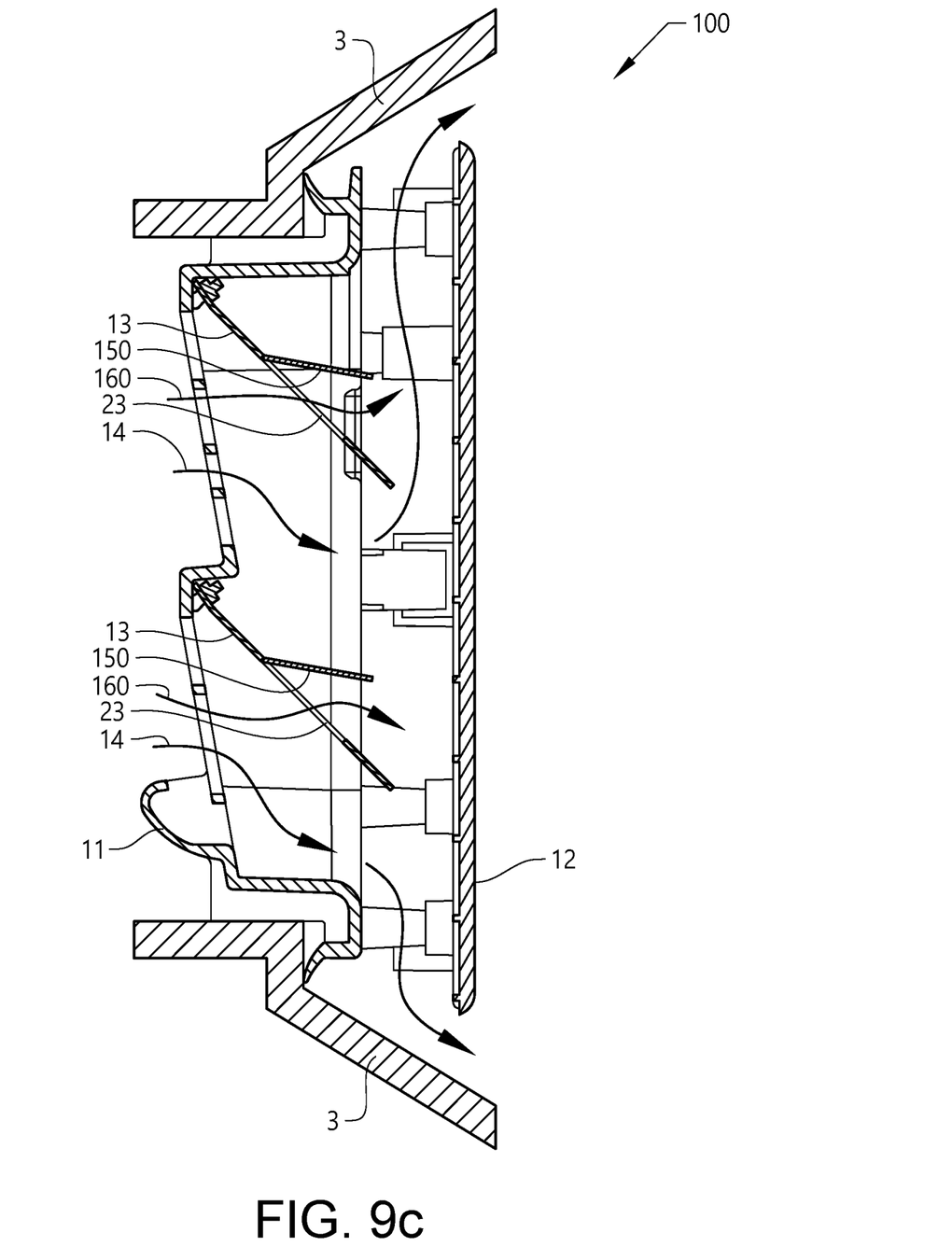

FIGS. 9a-9c show the function of the embodiment of FIGS. 6-8 at varying overpressure inside the cab 2. In FIG. 9a the pressure inside the cab 2 is the same as (or only slightly higher than, or lower than) the pressure outside the cab 2. All flaps 13, 150 are therefore in their closed position and there is no air flow through the vent device 100.

In FIG. 9b there is a moderate overpressure inside the cab 2 so that air is forced outwards through the vent device 100. The main flaps 13 are in their open position and air flows via flow path 14 towards the outer protection plate 12 and further out to the surroundings at a side of the protection plate 12. The overpressure is here not sufficiently large to generate an air flow of such magnitude that the additional flaps 150 open.

In FIG. 9c there is high over pressure inside the cab 2 generating a substantial air flow sufficient to set both the main flaps 13 and the additional flaps 150 in their open position. As in FIG. 9b the air flows along flow path 14 but also in the alternative flow path 160 through the flap openings 23 at the opened additional flaps 150. The vent device 100 is thus arranged so that the additional flaps 150 open at some threshold overpressure/air flow and provides for additional flow capacity through the device when needed. When the overpressure/air flow decreases the additional flaps 150 will move to its closed position, and after further decrease in pressure/flow also the main flaps 13 will close at some point.

In both embodiments, the vent device 10, 100 is provided with stop means 8 arranged to prevent each of the main and additional flaps 13, 15, 150 from moving in a direction towards the main body 11 when set in their closed position, see e.g. FIGS. 4 and 8.

Further, each of the main and additional flaps 13, 15, 150 are arranged in a pivoting manner with one side portion of each flap, i.e. an upper side portion, attached to the vent device 10, 100 and remaining side portions being non-attached so as to allow a swivelling movement between the closed and open positions. In the shown examples all flaps 13, 15, 150 have a rectangular shape, but other shapes are possible.

As can be seen in e.g. FIGS. 5a and 9a, the main flaps 13 are arranged at an angle in relation to the inlet side 11a of the main body 11 so that the main flap's attached side portion, i.e. the upper side portion, is located closer to the inlet side 11a than a side portion opposite to the attached side portion (i.e. the lower side portion).

All FIGS. 1, 5a-5c and 9a-9c show the vent device 10, 100 arranged in an opening of the cab wall 3 with the inlet side 11a of the main body 11 facing an inside of the cab 2 and the outer protection plate 12 facing outwards. As shown in FIGS. 5a-5c and 9a-9c, the wall 3 is inclined above and below the vent device 10, 100 so as to form a depressed and thereby protected area at the opening where the vent device 10, 100 is arranged. This opening is indicated as the space between the parts of the wall 3 shown in FIGS. 5a-5c and 9a-9c.

The flaps 13, 15, 150 may be made of a thermoplastic elastomer material. The thickness of the flaps may be around 1 mm. The main body 11 and the outer protection plate 12 may be made of e.g. polyamide or other plastic material.

It is to be understood that the present invention is not limited to the embodiments described above and illustrated in the drawings; rather, the skilled person will recognize that many changes and modifications may be made within the scope of the appended claims. For instance, additional flaps may be arranged both in the outer protection plate and in the main flaps. Further, various number, size and shape of flaps may be used depending on the particular application (cab size, available cross-sectional are for vent device, etc.) and pressure requirements (maximum overpressure, air flow rate, etc.).

The invention claimed is:

1. A vent device for passage of an air flow from inside of a vehicle cab to the outside, the vent device comprising:
   a main body having an inlet side, an outlet side, and one or more air passages; and
   an outer protection plate connected to the main body,
   wherein air flowing from the main body is directed to the outside via the outer protection plate,
   the vent device further comprising:
      one or more main flaps, wherein:
      each main flap is associated with a corresponding air passage,
      each main flap is arranged to be moveable between a closed position, in which it at least partly covers the corresponding air passage, and an open position, in which air is allowed to pass through the corresponding air passage in a flow path to the outside of the cab via the protection plate, and
      each main flap is configured to move from the closed position to the open position when the air pressure inside the cab is higher than outside the cab; and
      one or more additional flaps which are movable between a closed position and an open position,
      wherein each additional flap in its open position provides an alternative flow path to the outside of the cab via the protection plate;
      wherein the outer protection plate is provided with one or more plate openings forming the alternative flow path;
      wherein each of the one or more additional flaps is arranged on the outer protection plate in association with a corresponding plate opening.

2. The vent device of claim 1, wherein each of the one or more of the main flaps is provided with a flap opening forming the alternative flow path, wherein each of the one or more additional flaps is arranged on the one or more main flaps in association with a corresponding flap opening.

3. The vent device of claim 2, wherein the one or more additional flaps are smaller than the main flaps.

4. The vent device of claim 2, wherein the main flap forms a frame that extends around the flap opening.

5. The vent device of claim 1, wherein the vent device is provided with stop means arranged to prevent each of the one or more main flaps and the one or more additional flaps from moving in a direction towards the main body when set in their closed position.

6. The vent device of claim 1, wherein each of the one or more main flaps and the one or more additional flaps is arranged in a pivoting manner with one side portion of each flap attached to the vent device and remaining side portions being non-attached so as to allow a swivelling movement between the closed and open positions.

7. The vent device of claim 6, wherein the one or more main flaps are arranged at an angle in relation to the inlet side of the main body so that the main flap's attached side portion is located closer to the inlet side than a side portion opposite to the attached side portion.

8. A vehicle comprising a cab, wherein the cab is provided with the vent device of claim 1.

9. The vehicle of claim 8, wherein the vent device is arranged in an opening of a cab wall with the inlet side of the main body facing an inside of the cab and the outer protection plate facing outwards.

* * * * *